Nov. 9, 1948.   A. B. CLINE   2,453,303

DENTURE REPAIR TOOL

Filed Sept. 15, 1945

Inventor
Allen B. Cline
By R. S. Berry
Attorney

Patented Nov. 9, 1948

2,453,303

UNITED STATES PATENT OFFICE 2,453,303

DENTURE REPAIR TOOL

Allen B. Cline, Rosemead, Calif.

Application September 15, 1945, Serial No. 616,577

3 Claims. (Cl. 18—5.7)

This invention relates to denture repair devices of the type forming the subject matter of my United States Letters Patent No. 2,356,447, issued August 22, 1942, wherein provision is made for "spot" repair of a denture by the application of heat and pressure to a single tooth, a plurality of teeth, or any given point on the denture.

In the device of my above identified patent an upright angular arm is hinged to a base on which the denture to be repaired is held by being set in a body of cement or the like. This arm supports on fixed pivots a nut which is therefore tiltable relative to the arm and movable in an arc with the arm as the arm is swung on its hinge. A hollow screw is axially adjustable in the nut and carries on its lower end a matrix or mold holder for supporting a contour-restoring mold in position to be applied to the repair spot or point on the denture. The hollow screw is adapted to receive an electric heater for applying heat through the mold to the repair material. A flexible element is employed to tie the arm to the base so that the mold will be held against the repair spot.

In the use of this device the mold is moved to the desired position over the denture by swinging the arm on its hinge and by tilting the pivoted nut and screw to the desired angle or position to bring the mold against the spot to be repaired and finally, by adjusting the screw, the mold is pressed against such spot and the flexible tie element is fastened to the base to hold the arm and mold supporting parts in operative position.

While the device of said patent is advantageous and fulfills its purpose, it has limitations and objections. For example, the range of adjustments of the supporting arm is limited as the body of cement holding the denture on the base will obstruct certain movements of the arm. Moreover, the adjustment of the mold is limited to the swinging of the arm and the tilting of the nut on pivots fixed to the arm, therefore making it necessary to be quite exact in setting the denture on the base and often requiring that the mold-holding parts be disposed at such angles that the desired uniform application of heat and pressure and the desired positioning of the mold is sometimes difficult, if not impossible without resetting the denture. The necessity of swinging the arm from the base to position the mold also limits the points or the base at which the denture could be set. Moreover, the flexible tie does not afford the desired stability of the assurance of securely holding the mold in position under the effective pressure nor afford desired variations in the pressure of the mold against the work while the arm is held by said tie.

It is the purpose of the present invention to provide a denture repair tool of the character described which eliminates the objections present in the device of my above identified patent and embodies the improvements and affords the advantages in the art as follows:

1. The hinging of the supporting arm to the upper end of a stationary upright flange or bracket on the base whereby the denture may be set at various points on the base, the arm will extend nearly parallel with and well above the base, the upright extension will serve as a fixed buttress for the body of cement in which the denture is set, and the cement body will not interfere with adjustment of the arm. This arrangement also makes it possible to use a straight arm affording a sliding adjustment of the matrix or mold holder as well as the other adjustment hereinbefore noted.

2. The pivotal mounting of the nut on a slide which is slidably adjustable along the hinged arm an extent substantially equal to the working length of the base, whereby the screw supported by the nut and the matrix holder carried by the screw are bodily slidably adjustable along the arm as well as tiltably adjustable relative to the arm also movable in an arc with the arm as it is swung on its hinge, all, to the end that a more exact and an easier spotting of the mold along a given line on the fixed denture may be readily brought about. This arrangement also makes it possible to repair spaced spots along a line of the denture which is in the path of the sliding movement of the mold, without requiring resetting the denture.

3. A means for frictionally holding the mold supporting parts against gravitational tilting whereby such parts are at all times disposed in a position readily accessible for operation and when set to desired position over the work will remain in set position.

4. A positive and easily operable eye-bolt clamping means for holding the hinged mold-supporting arm in position for applying and maintaining the mold against the work, which means is readily adjustable to vary the pressure of the mold against the work.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

In the accompanying drawing, 7 designates a flat elongated metal base plate provided at one end with an upstanding integral support or bracket 8 on the upper end of which a mold supporting arm 9 is hinged as at 10. This arm is straight and overlies the base and is substantially equal thereto in length and width and U-shaped or bifurcated with the free ends of its legs 9' hinged to bracket 8.

Figure 5:
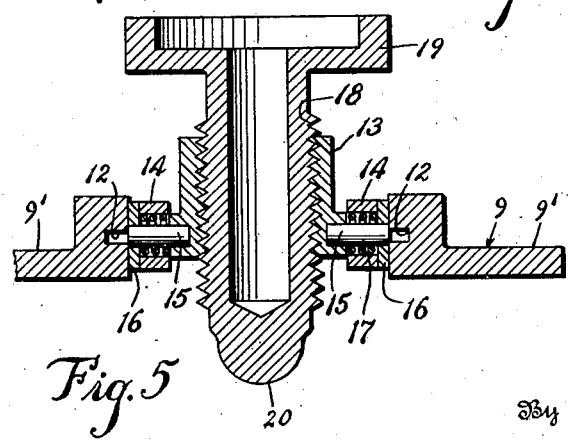
Fig. 5 is an enlarged fragmentary sectional view taken on the line 5—5 of Fig. 3.
Figure 6:
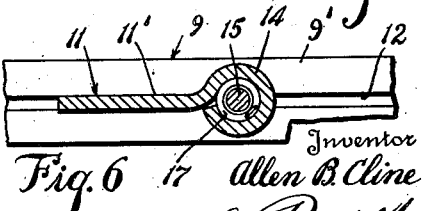
Fig. 6 is a fragmentary sectional view taken on the line 6—6 of Fig. 3.

A bifurcated slide plate 11 has opposed edges slidable on grooves 12 formed in the legs 9' of the arm 9 and pivotally supports a nut member 13 in the form of an internally screw threaded sleeve. The furcations 11' of the plate 11 are provided with eyes 14 through which extend pivot pins 15 carried by opposite sides of the nut 13. These pins extend through washers 16 interposed between the eyes and the adjacent side faces of the legs 9' of the arm 9 whereby the plate with the nut thereon is free to slide longitudinally of the arm while the nut is free to be swung or tilted on the pivot pins. Small coiled springs 17 are retained in the eyes 14 around the pins 15 and are compressed with their ends abutting the nut and washers 16 respectively so that the turning or tilting of the nut is frictionally resisted by the springs whereby the nut will be frictionally held in any position to which it is moved. The pins 15 as shown in Fig. 5 are of greater diameter than the width of the grooves 12 so that they may slidably contact the legs 9' of the arm 9 without entering the groove. In this connection it should be noted that the slide plate fits the grooves so that sufficient friction is set up to hold the plate against sliding out of position to which it is adjusted.

A hollow screw 18 is axially adjustable in the nut 13 and is provided with a knurled head 19 by which it may be turned, the hollowed out part of the screw providing a socket for reception of a heating means. The lower end 20 of this screw is free of screw threads and rounded so that it may be seated in a socket 21 in a mold or matrix holder 22. The outer end portion of the interior of the socket 21 is screw threaded so that the holder 22 may be screwed onto the screw 18, the rounded end 20 bottoming in the socket as a stop to limit the screw threaded engagement of these parts so that just sufficient threads are engaged on the screw to tightly retain the holder thereon against turning or dropping off, whereby the remainder of the threads on the screw will provide for considerable axial adjustment of the screw and holder thereon.

Figure 1:
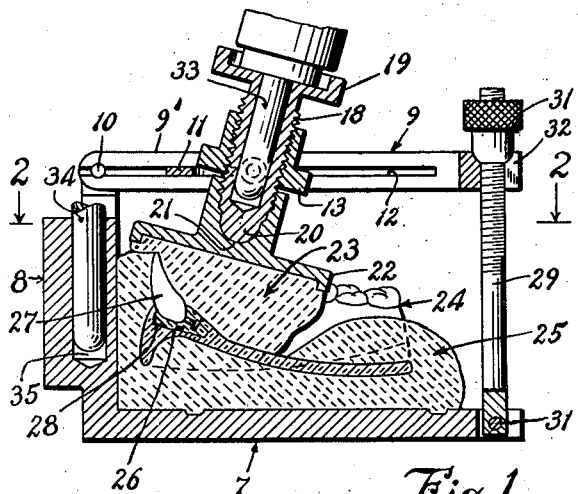
Fig. 1 is a fragmentary longitudinal sectional view of the tool embodying my invention as in operation, being taken on the plane of line 1 of Fig. 3.
Figure 3:
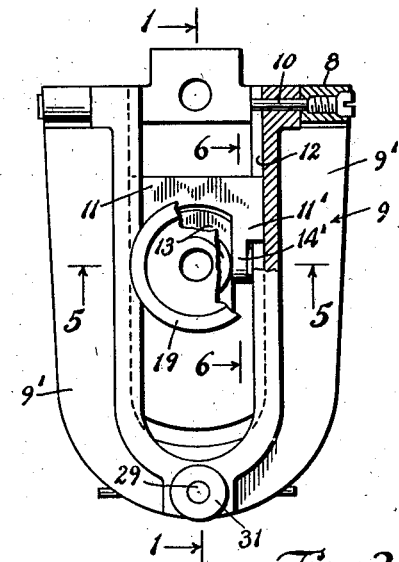
Fig. 3 is a fragmentary top plan view of the tool.
Figure 2:
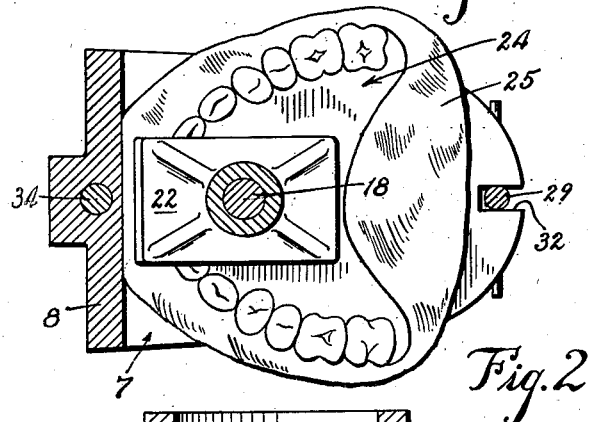
Fig. 2 is a horizontal sectional view of the tool taken on the line 2—2 of Fig. 1.
Figure 4:
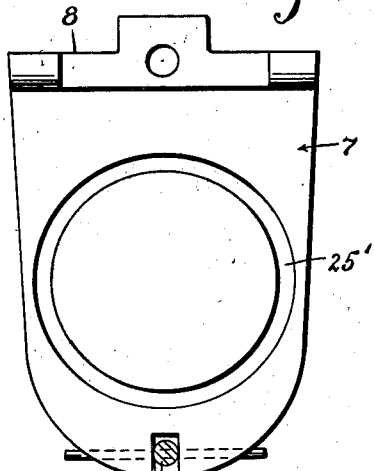
Fig. 4 is a top plan view of the base with the hinged arm removed.

It will now be seen that the holder 22 which is in the form of a flat inverted cup is adapted to hold thereon a contour restoring mold or matrix 23 which latter is made in any suitable manner well known in the art of mechanical dentistry for the purpose of applying heat and pressure to the part to be repaired and restoring the original position and contour of the repaired part of a denture such as the one 24 shown in Figs. 1 and 2.

The denture is set in plaster or cement 25 in the desired position on the base 7 whereby the mold 23 may be applied to the part to be repaired. The base is provided with an annular keying groove 25' for the plaster or cement. As here shown (Fig. 1) repair material 26 and the tooth 27 to be replaced are set in socket or cavity 28 which is formed in the plate of the denture, thereby preparing the denture for the application of the mold 23 to the repair spot. The method of preparing the mold or matrix 23 is described in my patent hereinbefore identified and as it is well known in the art need not here be further described.

With the denture 24 set on the base 7 so that the part to be repaired is accessible to the mold 23 mounted in the holder 22, the hinged arm 9 is swung into desired position and the nut 13 is slidably adjusted and if need be tilted as shown in Fig. 1 to bring the mold 23 over the repair spot.

By means of an eye bolt 29 hinged to the base 7 as at 30, and a nut 31 on the bolt, the arm 9 may be latched and held in the desired position there being a slot 32 in the arm to receive the bolt. The nut 31 is manipulated on the bolt while in contact with the upper side of the arm to clamp the arm in place and regulate the pressure of the mold on the denture.

The screw 18 is turned so as to bring the mold 23 into contact with the repair spot on the denture with the desired angular position of the arm 9 for engagement by the nut 31 which when tightened causes the arm 10 to transmit a pressure through the screw 18, holder 22 and mold 23 to the repair spot. Thus both the amount and direction of the pressure may be regulated by means of the screw 18 and the eye bolt 29 and nut 31.

As here shown the mold is heated by means of a suitable electric or other heating element 33 mounted in the hollow screw 18, as well as by means of another similar heating element 34 fitted in a socket 35 formed in the bracket 8. The application of heat and pressure through the mold to the repair material causes it to become fused and cured and the repair spot to assume the original contour of the denture, it being understood that the plate repair material may be of any plastic suitable for repairing plastic plate dentures and which will be cured by heat as afforded by the apparatus hereof, the pressure being applied in order to mold the denture repair area to its original contour during the curing process.

It should noted that the provision for bodily sliding the mold-supporting elements and mold relative to the arm which is clamped and held in substantial parallelism to the base, as here provided in addition to the tilting of said parts and the mold, make it possible readily and accurately to position the mold for exacting spot repair work and together with the other adjustments and the particular constructions and relative arrangement of the parts of the tool hereof, assure the performance of reliable repair work in a particularly efficacious manner.

I claim:

1. In a denture repair tool, an elongated base for supporting a denture to be repaired, a mold holder adapted to support contour-restoring mold for application to the repair area of the denture, an arm hingedly connected at one end to one end of said base, a member slidable along said arm, a member for supporting said mold holder, means connecting said mold-holder supporting member to said slide member so that the mold holder may be moved therewith to apply the mold to and remove it from the denture, said arm having a slot in its other end, an eye bolt hinged to the other end of said base and adapted to be swung into and out of said slot, and a nut on said bolt for clamping the arm in position to apply the mold to the denture and being adjustable to vary the pressure of the mold on the denture.

2. In a denture repair tool, a base adapted to support a denture to be repaired, an upstanding stationary support fixed on one end of said base, a bifurcated arm having the free ends of its furcations hinged to the upper part of said support, said furcations having grooves in their opposed faces, a slide member having portions extending into and slidable in said grooves, a nut pivoted on said slide member, a screw axially adjustably supported in said nut, a mold holder carried by said screw and adapted to support a mold for application to and removal from the denture, and means operative at the other ends of said base and said arm for clamping said arm in position to hold the mold against the denture.

3. In a denture repair tool, a base adapted to support a denture to be repaired, an upstanding stationary support fixed on one end of said base, a bifurcated arm having the free ends of its furcations hinged to the upper part of said support, said furcations having grooves in their opposed faces, a slide member having portions extending into and slidable in said grooves, a nut pivoted on said slide member, a screw axially adjustably supported in said nut, a mold holder carried by said screw and adapted to support a mold for application to and removal from the denture, spring loaded friction means associated with the pivots for said nut for holding the nut in position to which it is moved on its pivots, and means for clamping said arm in position to hold the mold against the denture including a bolt pivoted at one end to the other end of said base and a nut on said bolt for contacting the upper side of the other end of said arm.

ALLEN B. CLINE.

REFERENCES CITED

The following references are of record in the file of this patent:

UNITED STATES PATENTS

| Number | Name | Date |
| --- | --- | --- |
| 537,812 | Brogg | Apr. 23, 1895 |
| 1,201,876 | Rutan | Oct. 17, 1916 |
| 1,234,431 | White | July 24, 1917 |
| 1,724,691 | Andresen | Aug. 13, 1929 |
| 2,046,404 | Owen | July 7, 1936 |
| 2,289,142 | Parsens | July 7, 1942 |
| 2,356,447 | Cline | Aug. 22, 1944 |